US008067744B2

(12) United States Patent
Blevis et al.

(10) Patent No.: US 8,067,744 B2
(45) Date of Patent: *Nov. 29, 2011

(54) METHOD AND APPARATUS OF DETECTING IONIZING RADIATION

(75) Inventors: Ira Blevis, Zichron Yaakov (IL); Yaron Hefetz, Herzeliya (IL)

(73) Assignee: GE Healthcare Israel, Tirat Hacarmel (IL)

( * ) Notice: Subject to any disclaimer, the term of this patent is extended or adjusted under 35 U.S.C. 154(b) by 453 days.

This patent is subject to a terminal disclaimer.

(21) Appl. No.: 12/272,492

(22) Filed: Nov. 17, 2008

(65) Prior Publication Data

US 2009/0224167 A1    Sep. 10, 2009

Related U.S. Application Data

(63) Continuation-in-part of application No. 11/175,695, filed on Jul. 6, 2005, now Pat. No. 7,453,068.

(51) Int. Cl.
*H01L 27/146* (2006.01)
*G01T 1/24* (2006.01)

(52) U.S. Cl. .......... 250/370.09; 250/370.01; 250/370.13

(58) Field of Classification Search ............. 250/370.01, 250/370.09, 370.13
See application file for complete search history.

(56) References Cited

U.S. PATENT DOCUMENTS

| | | | |
|---|---|---|---|
| 5,677,539 A | 10/1997 | Apotovsky et al. | |
| 6,002,134 A | 12/1999 | Lingren | |
| 6,037,595 A | 3/2000 | Lingren | |
| 6,046,454 A | 4/2000 | Lingren et al. | |
| 6,169,287 B1 | 1/2001 | Warburton | |
| 6,218,668 B1 | 4/2001 | Luke | |
| 6,333,504 B1 | 12/2001 | Lingren et al. | |
| 6,528,797 B1 | 3/2003 | Benke et al. | |
| 6,553,092 B1 | 4/2003 | Mattson et al. | |
| 6,727,505 B2 | 4/2004 | Benke et al. | |
| 2002/0036269 A1* | 3/2002 | Shahar et al. | 250/370.1 |
| 2004/0178348 A1* | 9/2004 | Wainer et al. | 250/370.09 |

OTHER PUBLICATIONS

Doty, F.P. et al.; Pixellated CdZnTe Detector Arrays; Nuclear Instruments and Methods in Physics Research A 353 (1994) 356-360.

(Continued)

*Primary Examiner* — David Porta
*Assistant Examiner* — Mindy Vu
(74) *Attorney, Agent, or Firm* — Dean D. Small; The Small Patent Law Group

(57) ABSTRACT

A method of detecting ionizing radiation is provided. The method includes detecting ionizing radiation using a detector assembly having a pixelated semiconductor substrate, each pixel including a central region and a region of variable response, each pixel further including at least one anode, the detector assembly including a grid electrode coupled to a first surface of the semiconductor substrate such that the grid electrode circumscribes the central region of at least one pixel anode, the detector assembly further including a cathode coupled to a second surface of the semiconductor substrate, the method comprising, measuring a first signal between the at least one pixel anode and the cathode wherein the anode is electrically biased with respect to the cathode, measuring a second signal between the grid electrode and the cathode wherein the grid electrode is electrically biased with respect to the cathode, combining the magnitude of the first signal and the magnitude of the second signal to obtain a total signal from the semiconductor substrate, and outputting the total signal.

32 Claims, 4 Drawing Sheets

OTHER PUBLICATIONS

Lachis, Uri; CdTe Semiconductor Gamma Radiation Detectors Equipeped with Ohmic Contacts; Feb. 9, 1998; http://urila.tripod.com/dcte.htm; 4 pgs.

McGregor, D.S. et al; Single Charge Carrier Type Sensing with a Parallel Strip Pseudo-Frisch-Grid CdZnTe Semiconductor Radiation Detector; Applied Physics Letter, vol. 72, No. 7; Feb. 16, 1998; 4 pgs.

McNeil, W.J. et al; Single-Charge-Carrier-Type Sensing with an Insulated Frisch Ring CdZnTe Semiconductor Radiation Detector; Applied Physics Letter, vol. 84, No. 11; Mar. 15, 2004; 3 pgs.

Prettyman, Thomas H. et al.; Characterization of a Large-Volume, Multi-Element CdZnTe Detector; http://www.nis5.lanl.gov/; 10 pgs.

* cited by examiner

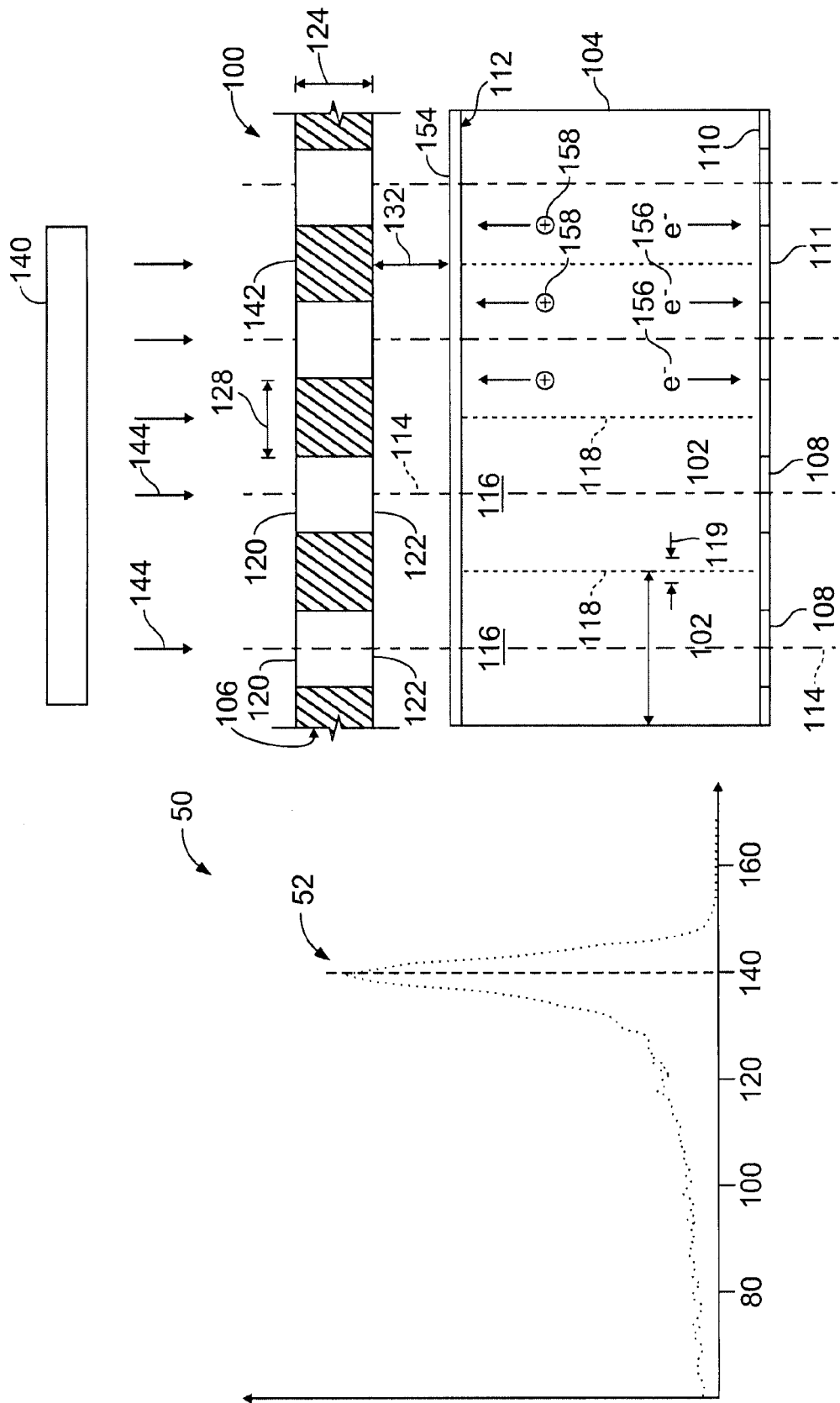

METHOD AND APPARATUS OF DETECTING IONIZING RADIATION

CROSS REFERENCE TO RELATED APPLICATION

This application is a continuation in part of U.S. application Ser. No. 11/175,695, filed Jul. 6, 2005 and entitled "METHOD AND APPARATUS OF DETECTING IONIZING RADIATION", the complete subject matter of which is incorporated herein by reference in its entirety.

BACKGROUND OF THE INVENTION

Embodiments of the present invention relate generally to imaging systems using pixilated detectors, and more particularly to pixilated semiconductor detectors in imaging systems.

Imaging devices, such as gamma cameras and computed tomography (CT) imaging systems, are used in the medical field to detect radioactive emission events emanating from a subject, such as a patient and to detect transmission x-rays not attenuated by the subject, respectively. An output, typically in the form of an image that graphically illustrates the distribution of the sources of the emissions within the object and/or the distribution of attenuation of the object is formed from these detections. An imaging device may have one or more detectors that detect the number of emissions, for example, gamma rays in the range of 140 keV, and may have one or more detectors to detect x-rays that have passed through the object. Each of the detected emissions and x-rays is typically referred to as a "count," but the detected emissions may also be counted together as a 'signal current'. The detector also determines the number of counts received at different spatial positions. The imaging device then uses the count tallies to determine the distribution of the gamma sources and x-ray attenuators, typically in the form of a graphical image having different colors or shadings that represent the processed count tallies.

A pixilated semiconductor detector, for example, fabricated from cadmium zinc telluride (CZT), may provide an economical method of detecting the gamma rays and x-rays. However, a low energy tail on the energy spectrum resulting from the CZT interaction with the radiation may interfere with the ability to distinguish detection of direct gamma rays and direct x-rays from detection of gamma rays and x-rays that have scattered in the subject before contacting the CZT. The tail may result in part from a different response of the semiconductor material in the regions between the pixels. Because of the low electric field of the semiconductor between the pixel anodes, electrons arrive late to the anode, resulting in "ballistic deficit". A low energy tail on the energy spectrum may also result from low hole mobility or trapping that causes charge integration derived from the pixel with respect to the common cathode to be incomplete.

BRIEF DESCRIPTION OF THE INVENTION

In one embodiment a method of detecting ionizing radiation is provided. The method includes detecting ionizing radiation using a detector assembly having a pixelated semiconductor substrate, each pixel including a central region and a region of variable response, each pixel further including at least one anode, the detector assembly including a grid electrode coupled to a first surface of the semiconductor substrate such that the grid electrode circumscribes the central region of at least one pixel anode, the detector assembly further including a cathode coupled to a second surface of the semiconductor substrate, the method comprising, measuring a first signal between the at least one pixel anode and the cathode wherein the anode is electrically biased with respect to the cathode, measuring a second signal between the grid electrode and the cathode wherein the grid electrode is electrically biased with respect to the cathode, combining the magnitude of the first signal and the magnitude of the second signal to obtain a total signal from the semiconductor substrate, and outputting the total signal.

In another embodiment an imaging system that includes a semiconductor detector is provided. The imaging system includes a pixilated semiconductor substrate responsive to ionizing radiation, the substrate including a first surface pixilated with at least one pixel anode, a grid electrode coupled to the pixilated surface, the grid electrode circumscribing a central region of the at least one pixel anode, and a cathode coupled to a second surface of the pixelated surface, the cathode substantially covering the second surface, and a controller configured to, measure a first signal between the at least one pixel anode and the cathode by applying a first bias voltage to the at least one pixel anode, measure a second signal between the grid electrode and the cathode by applying a second bias voltage to the grid electrode wherein the second bias voltage is less than the first bias voltage, and combine the magnitude of the first signal and the magnitude of the second signal to obtain a total signal from the semiconductor substrate.

In still another embodiment a radiation detector is provided. The radiation detector includes a semiconductor substrate comprising at least one pixel anode defined in a first surface of the substrate, the at least one pixel anode configured to receive a first bias voltage, a cathode electrically coupled to a second surface of the substrate, the cathode substantially covering the substrate, a grid electrode coupled to the first surface, the grid electrode circumscribing a central region of the at least one pixel anode and configured to receive a second bias voltage, a first measurement circuit configured to measure a first signal, a second measurement circuit configured to measure a second signal, and a summing circuit configured to combine the magnitude of the output of the first measurement circuit and the magnitude of the output of the second measurement circuit, the combination proportional to a total charge in the pixel volume.

BRIEF DESCRIPTION OF THE DRAWINGS

FIG. 1 is a graph that illustrates an exemplary energy spectrum of a single pixel of a pixilated CZT detector exposed to substantially unscattered 140 keV gamma rays;

FIG. 2 is a cross-sectional view of an exemplary radiation detector having a plurality of pixilated semiconductor detector elements.

DETAILED DESCRIPTION OF THE INVENTION

Figure 3:
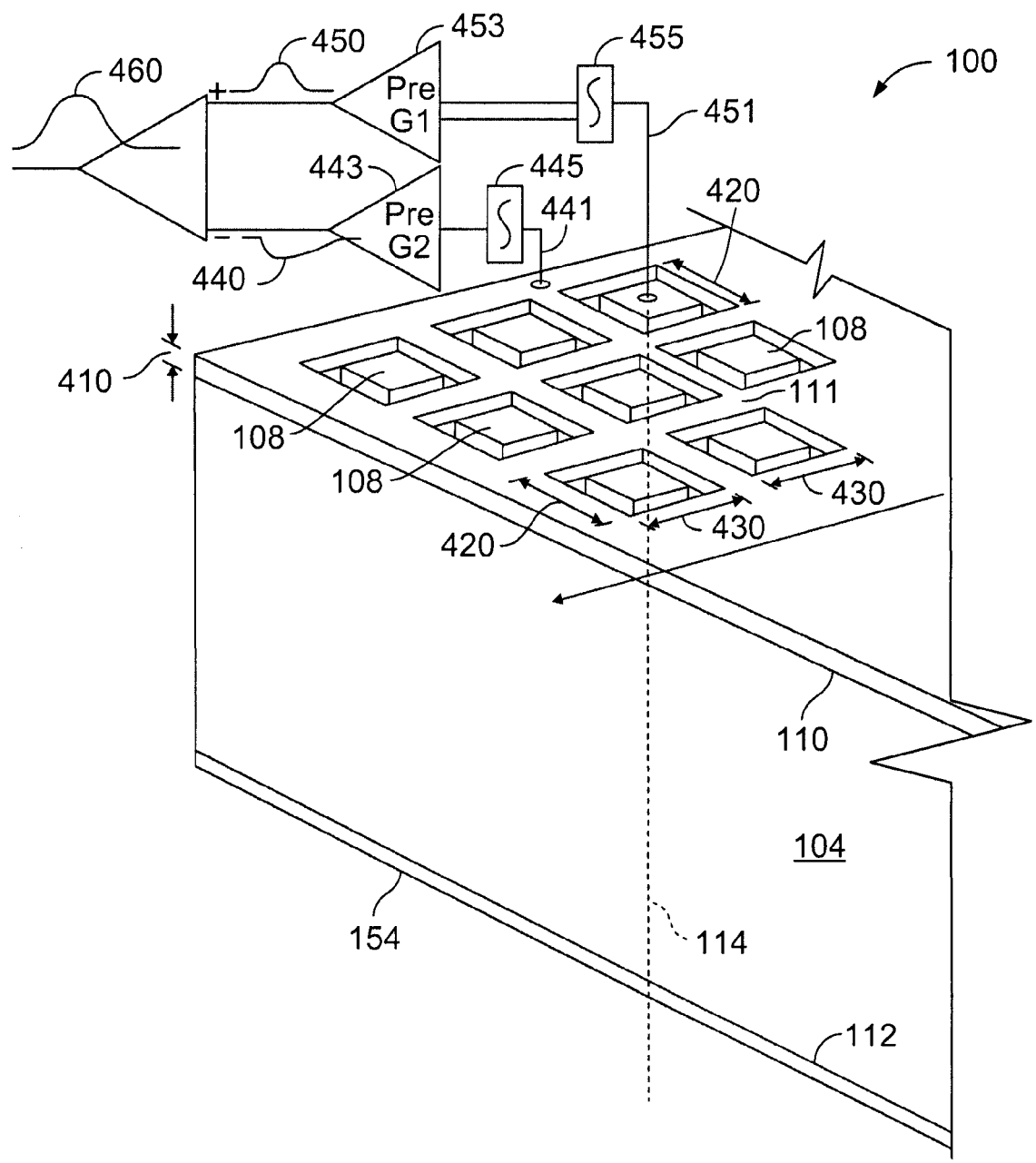
FIG. 3 is a perspective view of an exemplary radiation detector including a plurality of anodes and a grid electrode surrounding the plurality of anodes.

FIG. 1 is a graph 50 that illustrates an exemplary energy spectrum of a single pixel of a pixilated CZT detector exposed to substantially unscattered 140 keV gamma rays. Graph 50 includes an x-axis graduated in units of keV and a y-axis representative of an amount of total counts or count rate observed at each keV level. An energy spectrum peak 52 centered about 140 keV represents the gamma rays that have been absorbed substantially within a central region portion of a single pixel. The distribution of signal amplitudes of these events is approximately Gaussian. However, a significant number of gamma rays are also detected in the portion of the energy response spectrum that tails toward the lower energies. This tail effect is caused, in part, by Compton scattering, by gamma ray absorption events that do not confine all charge creation to within a single pixel and by non-ideal charge collection. Because the illustrated response function represents the distribution of measured signals from only a single pixel, charge that is lost from the pixel and shared with adjacent pixels is not included in the response function. As a result, gamma ray absorption events in which the charge collection is incomplete due to less than ideal charge collection, such as, charge sharing with other pixels, are lost from the peak region and contribute to the low energy tailing.

FIG. 2 is a cross-sectional elevation view of an exemplary imaging device detector 100 and includes a plurality of pixilated semiconductor detector elements 102 that may be used in connection with, for example, localizing a radiation interaction event in the detector 100. Detector 100 includes a detector substrate 104. Detector 100 may be formed of a radiation responsive semiconductor material, for example, cadmium zinc telluride (CZT) crystals. Detector elements 102 may be formed of the substrate 104 by pixelating a corresponding plurality of pixel electrodes coupled to a first surface 110 of detector substrate 104 (shown as a lower surface). A cross-sectional size and shape of detector elements 102 and a spacing between each of the detector elements 102 facilitates determining a location and size of each pixilated detector element 102. Specifically each pixilated detector element 102 is located proximate a second surface 112 (shown as an upper surface) of detector substrate 104 in substantial alignment with a longitudinal axis 114 of a corresponding pixel electrode 108. Each pixilated detector element 102 includes a central region 116, bounded by useful limits 118, defining an operating portion, and a region of variable response 119. Central region 116 and region of variable response 119 extend substantially from surface 110 to surface 112. In the exemplary embodiment, a grid electrode 111, having a substantially planar body is positioned to circumscribe central regions 116.

Within central region 116, pixilated detector element 102 has a substantially uniform and repeatable response characteristic to radiation incident on second surface 112. Detector substrate 104 includes regions of variable response 119 in areas outside central region 116. The region of variable response 119 exhibits a response characteristic to radiation that may be inconsistent or variable. An intrinsic spatial resolution of detector 100 may be defined by the size of, and the spacing between, each pixilated detector element 102. Because pixilated detector elements 102 may be non-homogeneous in response and because central region 116 has a substantially uniform and repeatable response characteristic, collimator 106 may be formed to allow gamma and x-ray photons to interact with central region 116 and to block gamma and x-ray photons from reaching the region of variable response 119.

In operation, photons 144, for example emission gammas and transmission x-rays, from a source 140 are directed towards second surface 112. Photons 144 pass between collimator septa 120 and exit collimator aperture 122. Second surface 112 may be substantially covered by a relatively thin single cathode electrode 154. First surface 110 has an array of small, between about one millimeters squared (mm$^2$) and about ten mm$^2$, generally square pixel electrodes 108 configured as anodes. A voltage difference applied between pixel electrodes 108 and electrode 154 during operation generates a detector electric field in substrate 104. The detector electric field may be, for example, about one kilovolts per centimeter to about five kilovolts per centimeter. Although pixel electrodes 108 are described in the exemplary embodiment as being generally square like the pixel, it should be understood that this exemplary shape is not limiting in other embodiments, in that other shapes of pixel electrodes 108 are contemplated.

When a photon is incident on substrate 104, the photon generally loses all its energy in substrate 104 by ionization and leaves pairs of mobile electrons 156 and holes 158 in a small localized region of substrate 104. As a result of the detector electric field, holes 158 drift toward cathode electrode 154 and electrons 156 drift toward pixel electrodes 108, thereby inducing charges on pixel electrodes 108 and cathode electrodes 154. The induced charges on pixel electrodes 108 are detected. The time is identified at which a photon was detected. It is also identified how much energy the detected photon deposited in the substrate 104 and where in the substrate 104 the photon interaction occurred. To facilitate optimum detection of gamma and x-ray photons, central region 116 should be in substantial alignment with apertures 122 and the relative dimensions of gap 132, length 124, aperture 122 and thickness 128 should be determined such that photons arriving at incident surface 142 are absorbed in collimator 106 or central region 116.

FIG. 3 is a perspective view of an exemplary view of the detector 100. Imaging device detector 100 includes detector substrate 104 with high voltage cathode electrode 154 covering substantially the entire second surface 112. In the exemplary embodiment, grid electrode 111, having apertures of width 420, length 430, and thickness 410 is placed to circumscribe the central regions of the detector elements 102 and corresponding pixel electrodes 108.

Each pixel electrode 108 is electrically connected, over a lead or trace 441, to a corresponding pre-amplifier 443. The grid electrode 111 is electrically connected, over a lead or trace 451, to a corresponding pre-amplifier 453. Signals from the pixel electrodes 108 and from the grid electrodes 111 are amplified by corresponding pre-amplifiers 443 and 453 to produce measured signals 440 and 450, respectively. The pre-amplifiers 443 and 453 amplify the incoming signals based on gain coefficients G2 and G1, respectively, which may be adjusted. Optionally the preamplifiers 443 and 453 may be AC coupled or DC compensated to avoid saturation. Integrator components 445 and 455 may be provided in series with the preamplifiers 443 and 453 to integrate, over time, the signals on the leads 441 and 451, respectively. The integrator components 445 and 455 may be provided before or after the preamplifiers 443 and 453. Optionally the pre-amplifiers 443 and 453 constitute current to voltage converters which integrate current over a limited bandwidth. For example, integrators may be AC coupled.

The measured signals 440 and 450 are output by the preamplifiers 443 and 453, and supplied to the input terminals of an operational amplifier 463. The Op-Amp 463 combines magnitudes of the measured signals 440 and 450 to produce a corrected signal 460. Optionally the measured signals 440 and 450 may be both positive, while one of the measures signals 440 and 450 is applied to a positive input of the Op-Amp 463 and the other of the measures signals 440 and 450 is applied to a negative input of the Op-Amp 463. Alternatively, the measured signal 450 from the pixel electrode 108 may be positive, while the measured signal 440 from the grid electrode 111 may be negative. Thus, the corrected signal 460 represents the difference between the measured signals 440 and 450.

Grid electrode 111 may have, applied to it, a potential (e.g., −20V) which is slightly lower than the potential of pixel electrodes 108 that may be at 0.0 volts. While in the present example, the pixel electrodes receive a bias voltage of 0.0 volts, alternatively the pixel electrodes may receive a non-zero bias voltage. Applying a negative voltage to grid electrode 111 has the effect of steering electrons 156 from the region of variable response 119 and directly to the pixel electrodes 108, thereby reducing the ballistic deficit. Applying (negative) voltage to grid electrode 111 also has the effect of steering electrons from grid electrode 111 to pixel electrodes 108, thereby separating the hole and electron signal induction on the pixel and grid electrodes 108 and 111.

Applying voltage to grid electrode 111 thus has the effect of measuring the trapped signal by electromagnetic induction. According to the Ramo's Theorem, the signal induced on the pixel electrode is proportional to the distance that the charge carrier transits. A charge that transits half the total distance, for instance, will induce half the available signal in the pixel electrode. Optionally a slight bias voltage may be applied to grid electrode 111 to cause the induction of signal 440 by electromagnetic induction that is equal and opposite to the missing charge trajectory. Combining the magnitude value from grid electrode 111 to the measured signal 450 from a pixel electrode 108 results in a corrected signal 460 from moving electrons 156 and holes 158, and those that have not been measured by direct means because of lost mobility. The combination is made with amplifier gain coefficient G1 and G2 that are adjusted empirically for details of the electrode shapes 108 and 111.

In accordance with one embodiment the physical dimensions and geometry and electrical parameters of the detector 100 may be selected based on certain criteria to improve, and potentially optimize, certain aspects of the performance (e.g., sensitivity, specificity reduce signal to noise ratio, etc.). As an example, the dimensions and geometry of the detector may include selection of the size of each pixel electrode, or the selection of each grid electrode or sub-grid electrode relative to the number of pixel electrodes within the grid electrode or sub-grid electrode. As another example, the electrical properties may include selection of a relative gain ratio for the gains set on the pre-amplifiers 443 and 453. By adjusting the relative gain ratio, the output of the amplifier 461 may become independent of a depth within the substrate, at which the photon interacts with the substrate. By way of example only the gain ratio G2/G1 may be set to equal R, where R represents the area of the grid proportion. The relative gain ratio may be calibrated in order to improve the detector performance. The gain ratio calibration may be set based on experimental studies of different detector configurations. Alternatively the gain ratio calibration may be set based on the geometry of the pixel electrodes and the grid electrodes.

Following is an exemplary calculation for correcting the signal as described:

| | |
|---|---|
| Electron charge = | E |
| total area of pixel anodes in a module = | AP |
| area of grid = | AG |
| area of grid proportion (per pixel) | R = AG/(AG + AP) |
| CZT slab thickness = | t |
| gamma is absorbed at depth | d |

-continued

| | |
|---|---|
| 'work function for CZT' | W = 4.5eV/e |
| γ energy for Tc$^{99m}$ | Eγ = 140 keV |
| Absorption gives charge | q = Eγ/W = 31ke |
| Ramo's theorem gives electron induction on hit anode: | E = q(t − d)/t |
| Hole Induction on anode plane | H = −qd/t |
| Hole induction on grid | GH = (−qd/t)/R |
| Output of Pre-1 (450) | P1 = G1 E |
| Output of Pre-2 (440) | P2 = G2 GH |
| Output of Op-amp | O = P1 − P2 = (G1 E) − (G2 GH) = G1 (q(t − d)/t) − (G2/R) (−qd/t) |

The noise contribution can be calculated to optimize the grid size. Following is a sample calculation. For a typical preamp (e.g. Ortec 142C) the RMS noise Referred To Input (rti) for input C=2 nF is N≈7.5 ke.

| | |
|---|---|
| Noise goal (RMS) | N = 3% for Tc$^{99m}$ |
| Grid Capacitance | GC = (C/N) 0.03 Eγ = 250 pF |
| Pixel Capacitance (measured on sample) | PC = 3 pF |
| Optimum Grid Size | GS = GC/PC = 82 pixels = 9 × 9 pixels |

Because modules of the semi-conductor substrate are presently made of slabs comprising 8×8 arrays of pixels, this is a convenient size.

The above-described imaging device detectors provide a cost-effective and reliable means for examining a patient. More specifically the imaging system includes a grid electrode circumscribing the central regions of all anodes which is held at a potential slightly lower than the pixel anodes. When read out together, the problems of ballistic deficit and low charge mobility are corrected, thereby yielding full performance of the detector.

An exemplary embodiment of pixilated photon detector methods and apparatus are described above in detail. FIG. 3 shows square pixel electrodes and grid openings but is not limited to square elements nor to the absolute or relative sizes illustrated. For example, round or oblong anodes and grid features and smaller or larger electrodes and/or grid openings may be used to facilitate reducing electric field emissions at sharp and/or corner features or different relative inductions.

Figure 4:
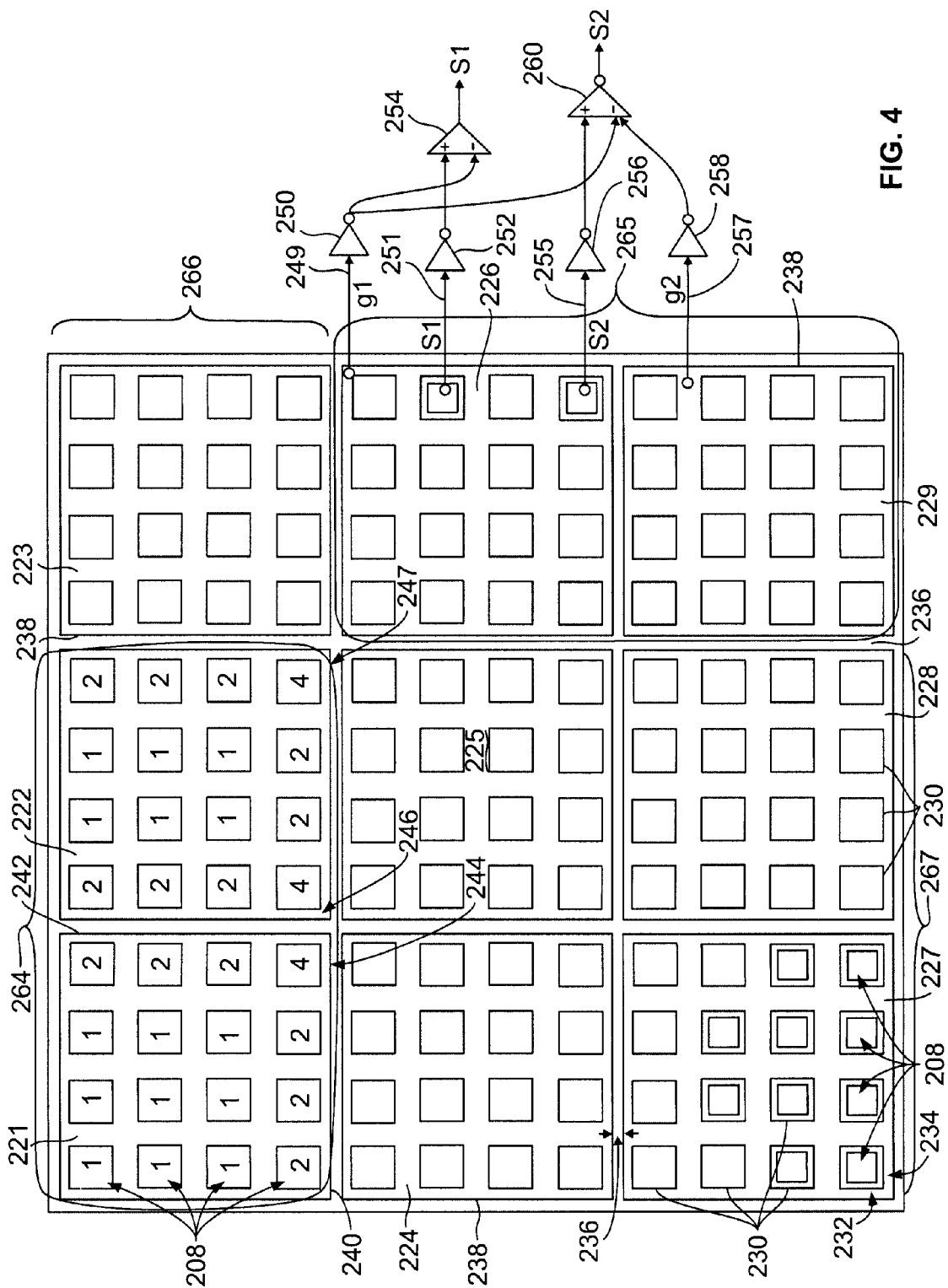
FIG. 4 illustrates a top plan view of a detector formed in accordance with an alternative embodiment.

FIG. 4 illustrates a detector 200 formed in accordance with an alternative embodiment. A top plan view of the detector 200 is shown in FIG. 4 with the first surface 212 facing upward and an opposed second surface facing into the page (not shown). While not shown in FIG. 4, it is understood that the opposite (second) surface of the detector 200 also includes an electrode (e.g., a cathode electrode). The detector 200 includes a grid electrode 211 that is segmented into multiple sub-grid electrodes 221-229 provided on the first surface 212. Each of the sub-grid electrodes 221-229 includes a plurality of apertures 230 there through. The apertures 230 through each sub-grid electrode 221-229 are arranged in an array that may be organized into rows 232 and columns 234. The detector 200 also includes a plurality of pixel electrodes 208 (only a portion of which are shown) that are electrically joined to the first surface 212 of the detector 200. The pixel electrodes 208 are positioned within, and electrically isolated from, the apertures 230 such that a corresponding one of the sub-grid electrodes 221-229 surrounds or circumscribes the corresponding array of pixel electrodes 208. To simplify FIG. 4, only a small portion of the pixel electrodes 208 are shown and denoted by reference numbers.

The sub-grid electrodes 221-229 have edges 238, where a portion of the edges 238 are positioned adjacent to edges of another sub-grid electrode 221-229 at grid-to-grid interfaces 236. In the exemplary arrangement, edges 238 of the sub-grid electrodes 221-229 may abut against and directly engage one another. Alternatively, adjacent edges 238 of the sub-grid electrodes 221-229 may be spaced apart from one another on the first surface 212. The grid-to-grid interfaces 236 extend parallel to the rows 232 and columns 234. Optionally the sub-grid electrodes 221-229 may have alternative shapes and thus the grid-to-grid interfaces 236 may extend along alternative paths.

The pixel electrodes 208 may be categorized into different types based on the location of the pixel electrode 208 on the detector 100 and based on the location of the pixel electrode 208 with respect to other pixel electrodes 208. To illustrate a potential categorization, a portion of the pixel electrodes 208 in FIG. 4 are denoted by numeric labels (1, 2, and 4). The labels 1, 2, and 4 illustrate exemplary types into which particular pixel electrodes 208 may be categorized. Within the sub-grid electrode 221, one of the pixel electrodes 208 (denoted as 4) is referred to as a bounded corner pixel electrode because it is located at a corner 244 that is bounded by three other sub-grid electrodes 222, 224 and 225. Within the sub-grid electrode 222, two pixel electrodes 208 (denoted at 4) represent bounded corner pixel electrodes, one of which is located at corner 246 that is bounded by three other sub-grid electrodes 221, 224 and 225 and the other of which is located at corner 247 that is bounded by three other sub-grid electrodes 225, 226 and 223.

The sub-grid electrode 221 also includes a set of pixel electrodes (denoted at 2), referred to as edge pixel electrodes. The edge pixel electrodes 2 represent pixel electrodes that are located along an edge 240 that is positioned adjacent to, and bordered by, another sub-grid electrode 224. The sub-grid electrode 221 also includes edge pixel electrodes 2 that are located along an edge 242 this is positioned adjacent and bordered by another sub-grid electrode 222. The edge pixel electrodes 2 do not constitute corner electrodes 4. The remainder of the pixel electrodes 208 surrounded by the sub-grid electrode 221, that are not corner pixel electrodes 4 and are not edge pixel electrodes 2, are referred to as center pixel electrodes (denoted at 1).

The sub-grid electrodes 221-229 are grouped into grid groups 264-267. The grid groups 264-267 may include one or more sub-grid electrodes 221-229. For example, grid electrodes 221-222 may be combined into one grid group 264, while grid electrode 223 represents a separate grid group 266. Sub-grid electrodes 224, 225, 227 and 228 are combined into another grid group 267, and sub-grid electrodes 226 and 229 are combined into another grid group 265. The sub-grid electrodes 226 and 229 in one grid group 265 are joined through leads 249 and 257 to pre-amplifiers 250 and 258. The outputs of pre-amplifiers 250 and 258 are combined and provided to an input of a summing operational amplifier 260. Each individual pixel electrode 208 surrounded by grid group 265 is joined through a corresponding lead (e.g., 251, 255) to a corresponding individual pre-amplifier (e.g., 252, 256). The outputs of each of the individual pre-amplifiers 252, 256 are supplied to inputs of corresponding summing amplifiers 254, 260. The pre-amplifiers 250, 252, 256, 258 may be adjusted to have different desired gains in order to provide a weighted summation for each pixel electrode 208 and the corresponding sub-grid group 265 of sub-grid electrodes 226 and 229.

Signals "s" and "g" are produced by pixel electrodes 208 and sub-grid electrodes 221-229 may be combined in different combinations to improve sensitivity. Different weights may be applied to pre-amplifiers associated with each type of pixel electrodes 208. For example, center pixel output signal S1 from each center pixel electrode 1 may be formed based on the equation $S1=s1-a*g1$, where s1 represents the center pixel signal output over a corresponding lead 251 from the corresponding pixel electrode 208; g1 represents the grid signal output 249 from the sub-grid electrode 226; and "a" represents a gain coefficient to be applied to the grid signal before summing the grid signal output and pixel signal. For example, side pixel output signal S2 from a side pixel electrode 2 may be formed based on the equation $S2=s2-b*g1-c*g2$; where s2 represents the pixel signal output 255 from the corresponding pixel electrode 208; g1 and g2 represent the grid signal outputs 249 and 257 from the corresponding sub-grid electrodes 226 and 229; and "b" and "c" represent gain coefficients to be applied to the grid signal outputs 249 and 257 before summing the grid signal outputs 249 and 257 with the edge pixel signal 255.

For example, corner pixel output signal S4 from a corner pixel electrode 4 may be formed based on the equation $S4=s4-d*g1-e*g2-e*g3-f*g4$; where s4 represents the corner pixel signal output from a corresponding pixel electrode 208; g1, g2 and g3 represent the grid signal outputs from corresponding sub-grid electrodes in a grid group 267 (e.g., 224, 225, 227 and 228); and "d", "e" and "f" represent gain coefficients to be applied to the grid signal outputs before summing the grid signal outputs faith a corner edge pixel signal.

Figure 5:
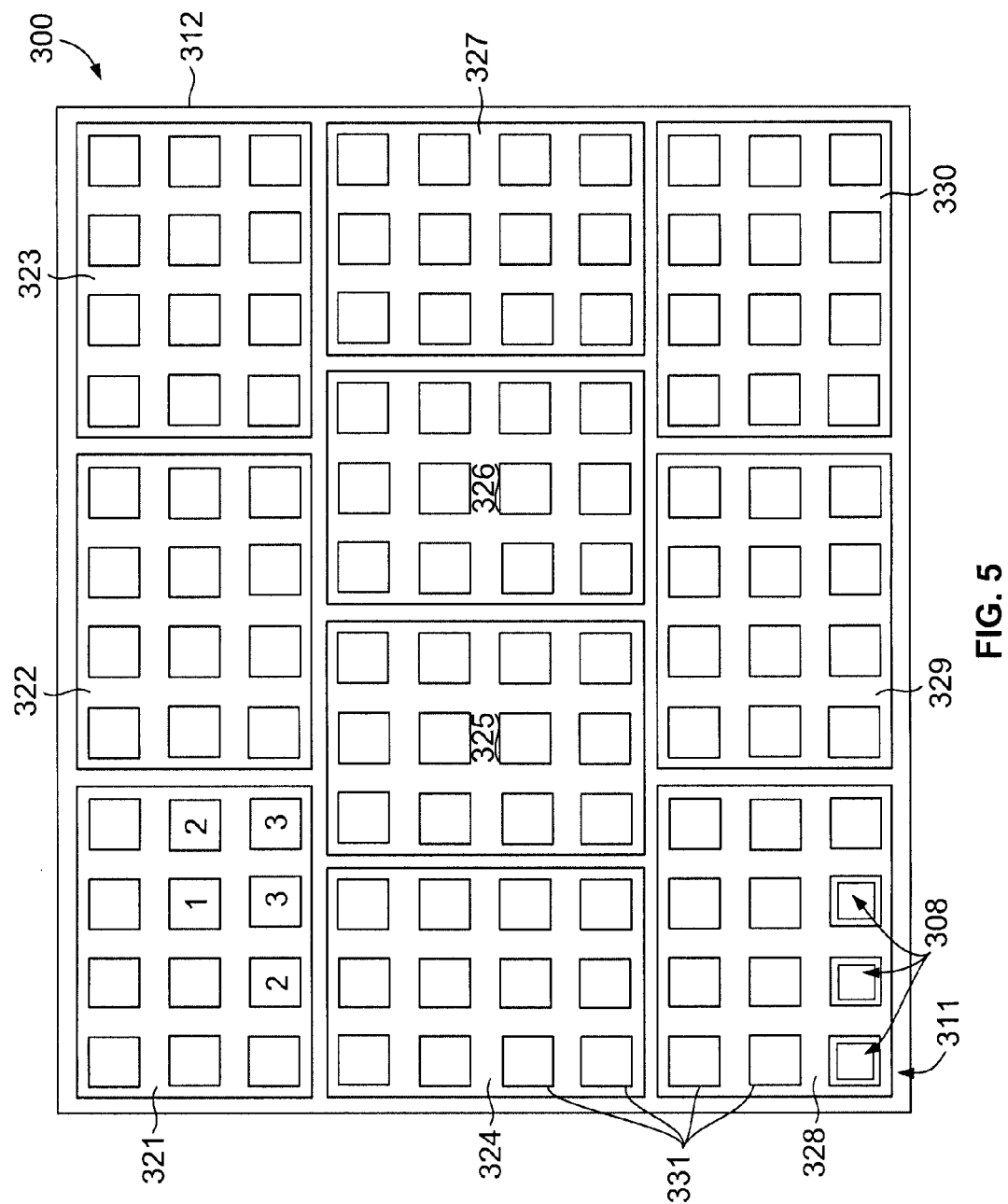
FIG. 5 illustrates a top plan view of a detector formed in accordance with an alternative embodiment.

FIG. 5 illustrates a detector 300 formed in accordance with an alternative embodiment. A top plan view of the detector 300 is shown in FIG. 5 with the first surface 312 facing upward and an opposed second surface (not shown). While not shown in FIG. 5, it is understood that an opposite (second) surface of the detector 300 also includes an electrode (e.g., a cathode electrode). The detector 300 includes a grid electrode 311 that is segmented into multiple sub-grid electrodes 321-330 provided on the first surface 312. Each of the sub-grid electrodes 321-330 includes a plurality of apertures 331 there through. The apertures 331 through each sub-grid electrode 321-330 are arranged in an array organized into rows and columns. The detector 300 also includes a plurality of pixel electrodes 308 that are electrically joined to the first surface 312 of the detector 300. The pixel electrodes 308 are positioned within the apertures 331 such that a corresponding one of the sub-grid electrodes 321-330 surrounds or circumscribes the pixel electrodes 308. The sub-grid electrodes 321-323, and 324-327 and 328-330 are arranged in rows that are shifted or offset with respect to one another. Thus, in the embodiment of FIG. 5, each sub-grid electrode 321-330 is bounded, at any given corner, by only two other sub-grid electrodes.

The pixilated photon detector components illustrated are not limited to the specific embodiment described herein, but rather, components of each pixilated photon detector and the gridded anode may be utilized independently and separately or repetitively from other components described herein. For example, the pixilated photon detector components described above may also be used in combination with different imaging systems and grid electrode 111 and related structures, G2 are reduced in size to surround one or more pixel electrodes and is then repeated for each grouping. A technical effect of the embodiment of the systems and methods described herein include improving the semiconductor detector response energy spectrum by reducing the characteristic tail of the response by reducing the effect of ballistic deficit and by measuring, by electromagnetic induction, charges stuck in the detector material due to poor charge mobility.

While the invention has been described in terms of various specific embodiments, those skilled in the art will recognize that the invention can be practiced with modification within the spirit and scope of the claims.

What is claimed is:

1. A method of detecting ionizing radiation using a detector assembly having a pixelated semiconductor substrate comprising a plurality of pixels, the detector assembly including a plurality of pixelated first electrodes coupled to corresponding pixels on a first surface of the semiconductor substrate, the detector assembly including a grid electrode coupled to the first surface of the semiconductor substrate, the grid electrode having apertures therethrough, the first electrodes being positioned within the apertures through the grid electrode, the detector assembly further including a second electrode coupled to a second surface of the semiconductor substrate, the method comprising;

measuring a first signal on at least one of the first electrodes;

measuring a second signal on the grid electrode;

combining the first signal and the second signal to obtain a corrected signal from the semiconductor substrate; and outputting the corrected signal.

2. The method of claim 1, wherein the first electrodes constitute anodes electrodes and the second electrode constitutes a cathode electrode.

3. The method of claim 1, wherein the first electrodes constitute cathode electrodes and the second electrode constitutes an anode electrode.

4. The method of claim 1, further comprising selecting a size for the grid electrode based on at least one of a capacitance of the first pixels and a capacitance of the grid electrode.

5. The method of claim 1, wherein the corrected signal comprises a noise contribution, the method further comprising selecting a size of the grid electrode to limit the noise contribution in the corrected signal.

6. The method of claim 1, wherein the grid electrode is segmented into sub-grid electrodes, each sub-grid electrode surrounding a set of pixel electrodes, the measuring of second signals includes measuring sub-grid signals from at least two sub-grid electrodes and combining the sub-grid signals.

7. The method of claim 1, further comprising applying first and second gain coefficients to the first and second signals, and selecting the first and second gain coefficients based, at least in part, on an area of the grid electrode.

8. The method of claim 1, wherein the grid electrode is segmented into sub-grid electrodes, each sub-grid electrode surrounding center, side and corner pixel electrodes, and wherein the combining operation combines the first signal from one of the side pixel electrodes with the second signal from one of the sub-grid electrodes and combines the first signal from one of the corner pixel electrodes with the second signals from at least two of the sub-grid electrodes.

9. The method of claim 1, wherein the grid electrode is segmented into sub-grid electrodes, the pixel electrodes being classified as at least one of center, side and corner pixel electrodes based on a position of the pixel electrodes with respect to other sub-grid electrodes, the combining operation applying different gain coefficients to the first signals from pixel electrodes based on the classification of the at least one of center, side and corner pixel electrodes.

10. An imaging system comprising a semiconductor detector, said imaging system comprising:

a pixilated semiconductor substrate responsive to ionizing radiation, said substrate comprising:

a first surface pixilated with a plurality of pixel electrodes, a grid electrode coupled to the first surface, the grid electrode having apertures therethrough, the first electrodes being positioned within the apertures through the grid electrode, and a cathode coupled to a second surface of said pixelated surface, the cathode substantially covering said second surface; and a controller configured to;

measuring a first signal on at least one of the first electrodes;

measuring a second signal on the grid electrode;

combining the first signal and the second signal to obtain a corrected signal from the semiconductor substrate; and outputting the corrected signal.

11. The system of claim 10 wherein the first electrodes include a plurality of anode electrodes formed on the first surface of the semiconductor substrate, a size and a location of the anode electrodes defines a size and location of the respective pixel.

12. The system of claim 10 wherein the first electrodes and the second electrode have a first bias voltage difference therebetween, and the grid electrode and the second electrode have a second bias voltage difference therebetween, the second bias voltage difference being less than the first bias voltage difference.

13. The system of claim 10 wherein the first electrodes are maintained at about 0.0 Volts, the grid electrode is biased to a first voltage, and the cathode is biased to a second voltage.

14. The system of claim 10 wherein the controller is configured to measure a total electron charge in the at least one of the first electrodes.

15. The system of claim 10 wherein the controller is configured to measure at least a portion of a total hole charge in the at least one of the first electrodes.

16. The system of claim 10, wherein the grid electrode is segmented into sub-grid electrodes, each sub-grid electrode surrounding a set of pixel electrodes, the controller is configured to measure sub-grid signals from at least two sub-grid electrodes and combining the sub-grid signals.

17. The system of claim 10, wherein the grid electrode is segmented into sub-grid electrodes, each sub-grid electrode surrounding center, side and corner pixel electrodes, and wherein the controller is configured to combine the first signal from one of the side pixel electrodes with the second signal from one of the sub-grid electrodes and to combine the first signal from one of the corner pixel electrodes with the second signals from at least two of the sub-grid electrodes.

18. The system of claim 10, wherein the grid electrode is segmented into sub-grid electrodes, the pixel electrodes being classified as at least one of center, side and corner pixel electrodes based on a position of the pixel electrodes with respect to other sub-grid electrodes, and wherein the controller is configured to apply different gain coefficients to the first signals from pixel electrodes based on the classification of the at least one of center, side and corner pixel electrodes.

19. The system of claim 10, wherein the grid electrode is segmented into sub-grid electrodes having edges, a portion of the edges being positioned adjacent to one another at grid-to-grid interfaces.

20. A radiation detector, comprising:

a pixelated semiconductor substrate comprising a plurality of pixels and having first and second surfaces;

a plurality of pixelated first electrodes coupled to corresponding pixels on the first surface of the semiconductor substrate;

a grid electrode coupled to the first surface of the semiconductor substrate, the grid electrode having apertures therethrough, the first electrodes being positioned within the apertures through the grid electrode;

a second electrode coupled to the second surface of the semiconductor substrate;

a circuit configured to form a combined output based on a first signal from at least one of the pixelated first electrodes and based on a second signal from the grid electrode, the combined output being representative of a total charge in a corresponding pixel.

21. The detector of claim 20, wherein the circuit comprises:
a first measurement circuit configured to measure the first signal on at least one of the pixelated first electrodes;
a second measurement circuit configured to measure the second signal on the grid electrode; and
a summer circuit configured to combine the first and second signals.

22. The detector of claim 20, wherein said substrate comprises Cadmium Zinc Telluride (CZT).

23. The detector of claim 20, wherein said first signal is indicative of a total electron charge measured in the at least one of the pixelated first electrodes.

24. The detector of claim 20, wherein said second signal is indicative of a total hole charge measured in the at least one of the pixelated first electrodes.

25. The detector of claim 20, wherein the grid electrode is segmented into sub-grid electrodes, each sub-grid electrode surrounding a set of pixel electrodes.

26. The detector of claim 20, wherein the grid electrode is segmented into sub-grid electrodes, each sub-grid electrode surrounding center, side and corner pixel electrodes, and wherein the circuit is configured to combine the first signal from one of the side pixel electrodes with the second signal from one of the sub-grid electrodes and to combine the first signal from one of the corner pixel electrodes with the second signals from at least two of the sub-grid electrodes.

27. The detector of claim 20, wherein the grid electrode is segmented into sub-grid electrodes, the pixel electrodes being classified as at least one of center, side and corner pixel electrodes based on a position of the pixel electrodes with respect to other sub-grid electrodes, and wherein the circuit is configured to apply different gain coefficients to the first signals from pixel electrodes based on the classification of the at least one of center, side and corner pixel electrodes.

28. The detector of claim 20, wherein the grid electrode is segmented into sub-grid electrodes having edges, a portion of the edges being positioned adjacent to one another at grid-to-grid interfaces.

29. A method for improving energy resolution of a pixelated solid state detector, the method comprising:

providing a pixelated solid state detector, the detector including a substrate and a plurality of pixelated first electrodes coupled to corresponding pixels on a first surface of the substrate, the detector including at least two sub-grid electrodes coupled to the first surface of the substrate, the sub-grid electrodes each having apertures therethrough, the first electrodes being positioned within the apertures, each of the sub-grid electrodes being electrically separated from one another and surrounding a sub-group of the pixel electrodes, the detector further including a second electrode covering a second surface of the substrate;

providing a first voltage to the pixel electrodes with respect to the second electrode;

providing a different second voltage to the sub-grid electrodes with respect to the second electrode, wherein the sub-grid electrodes being maintained at a negative potential with respect to the first pixel electrodes;

detecting signals, induced by a gamma event, on one of the first pixel electrodes and at least one sub-grid electrode; and utilizing the signals detected to produce an output signal representative of the gamma event.

30. The method of claim 29, wherein the sub-grid electrodes are located adjacent to one another along a grid-to-grid interface, the first pixel electrodes including an edge pixel electrode that is located proximate to the grid-to-grid interface, the method further comprising obtaining first and second weighted sub-grid signals from the sub-grid electrodes located adjacent to one another and subtracting the first and second weighted sub-grid signals from a signal from the edge pixel electrode.

31. The method of claim 29, wherein the at least two sub-grid electrodes include first, second and third sub-grid electrodes, the first sub-grid electrode having a corner that is bounded by at least the second and third sub-grid electrodes, the first pixel electrodes including a corner pixel electrode that is located within and proximate to the corner of the first sub-grid electrode, the method further comprising obtaining first, second and third weighted sub-grid signals from the first, second and third sub-grid electrodes and subtracting the first, second and third weighted sub-grid signals from a signal from the corner pixel electrode.

32. The method of claim 29, further comprising compensating for an effect of charge induced by incomplete hole collection.

* * * * *